Patented May 15, 1945

2,375,752

UNITED STATES PATENT OFFICE 2,375,752

COATING COMPOSITIONS

Irwin C. Clare, Elmhurst, Del., assignor to Hercules Powder Company, Wilmington, Del., a corporation of Delaware No Drawing. Application February 9, 1942,
Serial No. 430,081

3 Claims. (Cl. 106—30)

This invention relates to ink compositions, and more particularly to ink compositions having improved properties of length, flow-out, and stability.

Three types of printing are generally employed, namely, typographic, lithographic, and intaglio. In typographic printing, type is employed to convey the impression to the paper. In lithographic printing the impression is conveyed from a stone or metallic plate upon which the proper design has been traced with crayon. Intaglio printing is carried on using engraved plates. The number of inks used in practice is very large, and the particular ink employed depends upon the type of printing involved, type of press, speed of the press, type of paper, temperature and humidity conditions, as well as other factors.

Ordinary rosin and ester gum have been used in ink compositions since they improve the rate of set and decrease show through. However, their use in such compositions has been seriously restricted by their tendency to shorten the ink, that is, to cause the composition to attain a buttery consistency. In the past a long ink containing rosin or ester gum has generally been accompanied by a tendency to flow out from under the type, thereby giving blurred impressions. Therefore, the formulator has been definitely restricted in preparing inks containing rosin or rosin ester of suitable length and flow-out properties. A further disadvantage encountered in the use of rosin arises from its acidic nature. Basic pigments are liable to be destroyed by their reaction with rosin.

Now, in accordance with this invention, ink compositions having increased length, better flow-out properties, and greater chemical stability are provided by utilizing a polymerized rosin ester as the resin constituent of the ink. More specifically, these improved inks comprise an ester of a polymerized rosin dissolved in a suitable solvent, such as 22° Baumé mineral ink oil, in admixture with a pigment, such as carbon black. If desired, driers and modifiers may be incorporated.

Having thus indicated in a general way the nature and purpose of this invention, there follow specific examples to illustrate the practice thereof. In the examples, the term "parts" represents weight units, unless otherwise indicated.

Example I

A red news ink composition was prepared containing the following ingredients:

| | Parts |
|---|---|
| Lithol red toner | 60 |
| China clay | 50 |
| Mineral oil 22° Baumé | 185 |
| Glycerol ester of a polymerized rosin. Acid number 6.6; drop melting point 109° C.; color (Lovibond), 34 Amber. | 75 |
| No. 0 litho oil | 125 |
| Lead linoleate paste (18% lead) | 6 |
| Manganese linoleate paste (5.8% manganese) | 4 |
| Cobalt linoleate paste (5.6% cobalt) | 2.5 |

The ester gum was dissolved in the mineral oil by heating to 350° F., and the litho oil and driers were then mixed with the varnish so obtained. The resulting vehicle was mixed with the pigment and given four passes through a three-roll steel mill. A comparison ink was made using an N wood rosin ester gum having a drop melting point of 89° C., an acid number of 7.7, and a Lovibond color of 23 Amber in place of the polymerized rosin ester gum. An examination of the two inks showed the ink containing the polymerized rosin ester to be considerably longer and to give a soft paste having much better flow-out than the ink prepared with the N wood rosin ester.

Example II

A yellow lithographic ink was prepared containing the following ingredients:

| | Parts |
|---|---|
| Medium chrome yellow | 200 |
| Whiting | 40 |
| No. 0 litho oil | 68 |
| Glycerol ester of a boron fluoride polymerized rosin. Acid number 7.6; drop melting point 125° C.; Lovibond color of 53 Amber. | 200 |
| 22° Baumé mineral ink oil | 12 |
| Lead linoleate paste (18% by weight lead) | 3 |
| Manganese linoleate paste (5.8% by weight manganese) | 2 |
| Cobalt linoleate paste (5.6% by weight cobalt) | 1 |

The ester gum, oils and driers were heated together at 300° F. until a solution was obtained. The ink varnish was then cooled and mixed with the pigment, and the mixture was given three passes through a three-roll steel mill to form the finished ink composition.

Example III

An ink varnish was prepared by heating 120 parts of mineral ink oil (A. P. I. gravity of 21.9 and Saybolt viscosity of 527 seconds at 100° F.) and 80 parts of the glycerol ester of a sulfuric acid polymerized rosin (acid number of 7.5, Lovibond color of 30 Amber, and drop melting point of 115° C.) at a temperature of 350° F. for 15 minutes. A black cylinder press ink was prepared from this varnish by mixing the following ingredients:

| | Parts |
|---|---|
| Varnish | 35 |
| No. 3 litho oil | 10 |
| Boiled linseed oil | 10 |
| Wax nonoffset compound | 4 |
| Cobalt linoleate paste (5.6% by weight of cobalt) | 6 |
| Carbon black pigment | 20 |
| Blue toner | 17 |

A vehicle was first prepared by heating all of the ingredients except the pigment at 300° C. After this, the vehicle was cooled, admixed with the pigment, and the paste given three passes through a three-roll steel mill. The wax nonoffset compound was prepared by fusing 35 parts of No. 1 litho oil, 35 parts of soft cup grease, 10 parts of paraffin wax, and 20 parts of beeswax, and then permitting the mixture to cool. The blue toner was prepared by dissolving 20 parts of Victoria blue, B base in 120 parts of oleic acid with the aid of mild heating.

The foregoing examples illustrate that considerable improvement in inks with respect to length, flow-out properties, and chemical stability may be accomplished by inclusion of a polymerized rosin ester in inks in accordance with this invention.

As shown in the examples, an ink vehicle is prepared by dissolving an ester of a polymerized rosin in a suitable solvent, with or without the aid of heating to provide solution. Pigments, driers, and modifiers may then be added to the vehicle, the amounts of these depending upon the specific qualities desired by the formulator. A uniform ink composition is then prepared in the customary manner by the use of suitable mixing means, such as a three-roll steel mill.

In place of the polymerized rosin esters shown in the examples, any other monohydric or polyhydric alcohol ester of polymerized rosin may be used, such as the methyl, ethyl, normal propyl, butyl, ethylene glycol, diethylene glycol, triethylene glycol, glycerol, diglycerol, pentaerythritol, sorbitol, mannitol, dulcitol, etc., esters. Suitable polymerized rosin esters may be prepared from any of the various grades of wood or gum rosin, or of the pure rosin acids contained therein. Esters of polymerized rosin suitable in these novel ink compositions are those having a drop melting point between about 10° and about 175° C. Preferably, esters having a drop melting point between about 100° and about 150° C. are employed. The proportion of polymerized rosin ester useful in the ink compositions of this invention may be from about 2 to about 65% of the total ink composition, and preferably from about 5 to about 55% of the total composition.

The polymerized rosin esters may be prepared by esterification of rosin with an alcohol followed by polymerization of the ester obtained, or by first polymerizing the rosin and then esterifying the polymerized rosin obtained with an alcohol. The polymerization of the rosin or of the rosin ester may be performed in the presence of any of the polymerization catalysts known in the art, such as sulfuric acid, organic substituted sulfuric acids, phosphoric acid, boron trifluoride, metallic halides as zinc chloride, aluminum chloride, hydrofluoric acid, or by treatment of the rosins or of the rosin ester with a high voltage, high frequency electric discharge. The polymerization by any of the procedures mentioned above is carried out usually by treatment of the rosin or rosin ester dissolved in a suitable, inert organic solvent, such as gasoline, benzene, ethylene chloride, etc. After polymerization, if desired, the polymerized rosin or rosin ester may be refined by a suitable refining treatment, such as contacting with selective colorbody solvents, adsorbents, etc., or by suitable heat treatment.

Any suitable solvent for the polymerized rosin ester may be used, depending upon the specific properties desired by the formulator. Instead of the mineral oils used in the examples, coal tar hydrocarbons, as benzol, toluol, xylol, etc.; petroleum hydrocarbons, as gasoline, hexane, heptane, spindle oil, etc.; alicyclic-aromatic compounds, as tetrahydronaphthalene and decahydronaphthalene; terpenes, etc., are all suitable solvents.

These ink compositions may contain drying oils, such as bodied linseed oil, bodied castor oil, bodied tung oil, etc., but to obtain the maximum rate of drying, the use of these materials is definitely restricted. Driers such as non-aqueous solvent solutions of the organic derivatives of cobalt, manganese, lead, iron, etc. may be employed in the ink compositions. Such organic derivatives are the resinates, naphthenates, linoleates, etc. A combination of such metal derivatives in solution and known to the art as Japan drier may also be used in total or in part.

In place of the carbon black used in the examples, any of the pigments usually employed in the art may be employed, such as lamp black, peacock blue, iron blues, lithol toner, gloss white, whiting, alumina hydrate, titanium dioxide, titanium base pigments, and others. Dark pitches, such as stearine pitch, petroleum asphalt, or black resins, such as gilsonite, may also be used in the ink compositions.

To overcome the brownish tone of the oil and carbon black, an oil-soluble toner may be added to the vehicle before the addition of the carbon black. Suitable dyes for preparing toners are Victoria Blue base, Methylene Blue base, Methyl Violet base, or nigrosene or indulene.

Compositions containing esters of polymerized rosin provide improved ink compositions. The use of such esters in ink compositions improves the rate of set and decreases show through, without producing an ink of buttery consistency. Inks containing esters of polymerized rosin are characterized by increased length without a corresponding tendency to flow out from under the type. Furthermore, they do not tend to deteriorate in color, liver, or otherwise change in consistency by the reaction of an acidic material with any basic pigment present.

What I claim and desire to protect by Letters Patent is:

1. A printing ink comprising mineral ink oil, an ester of polymerized rosin, and a pigment, said ester having a drop melting point between about 10 and about 175° C. and being present in a quantity between about 2% and about 65% of said ink, said ink being characterized by decreased tendency to flow out from under type and greater length than similar inks containing the corresponding ester of unpolymerized rosin.

2. A printing ink comprising mineral ink oil, a glycerol ester of a polymerized rosin, and a pigment, said ester having a drop melting point between about 100 and about 150° C. and being present in a quantity between about 2% and about 65% of said ink, said ink being characterized by decreased tendency to flow out from under type and greater length than similar inks containing the corresponding ester of unpolymerized rosin.

3. A printing ink comprising mineral ink oil, a glycerol ester of a polymerized rosin, carbon black, and a toner, said ester having a drop melting point between about 100 and about 150° C. and being present in a quantity between about 2% and about 65% of said ink, said ink being characterized by decreased tendency to flow out from under type and greater length than similar inks containing the corresponding ester of unpolymerized rosin.

IRWIN C. CLARE.